April 5, 1966  R. G. HENNESSEY ET AL  3,244,470
SOUND-AND PICTURE-ON-FILM REPRODUCING SYSTEM
Filed Oct. 3, 1963  2 Sheets-Sheet 1

United States Patent Office 3,244,470
Patented Apr. 5, 1966

3,244,470
SOUND-AND-PICTURE-ON-FILM REPRODUCING SYSTEM
Raymond G. Hennessey, Centerport, Hans F. Napfel, Huntington, and Lee H. Schank, Huntington Station, N.Y., assignors to Fairchild Camera and Instrument Corporation, a corporation of Delaware
Filed Oct. 3, 1963, Ser. No. 313,630
9 Claims. (Cl. 352—29)

This invention relates to sound-and-picture-on-film reproducing systems and particularly to such systems of the type including as a component a readily interchangeable film magazine.

Heretofore, there have been proposed certain sound-and-picture-on-film reproducing systems including interchangeable film magazines. It is recognized that, in such systems, proper synchronization of the sound and pictures requires an accurate positioning and movement of the film with respect to the sound pickup head and the film gate. However, in all such systems heretofore proposed, the film magazine has included an active film-advancing or a film-positioning device, or both. This has involved a number of difficulties. For example, the film has engaged with a sprocket wheel in the magazine which, in turn, had to engage the basic mechanism on the frame to acquire motive power to drive the film or the magazine has included the pinch roll for engaging the film capstan on the basic apparatus frame. Since the pinch roll is required to exert considerable pressure against the capstan, this means that there is an equal force reacting on the magazine so that it must be of a relatively strong and rigid construction and must be clamped securely and precisely to the frame of the apparatus in order to maintain the required capstan-pinch roll pressure.

Furthermore, if the film magazine is relied on accurately to position the film with respect to the sound head, the film gate, etc., the film magazine casing or housing must be a rigid, precision-made component having dimensional stability with respect to variations in temperature, humidity, age, etc. and must be located with respect to the apparatus frame by precision means also of dimensional stability.

On the other hand, the user of reproducing systems of the type described often requires or desires a considerable library of film magazines. Therefore, it is desirable that the magazine be as inexpensive as possible as, for example, by making its casing or housing of a molded thermoplastic resin. Such a molded plastic magazine housing ordinarily does not have sufficient rigidity or strength and does not have sufficient dimensional stability to make it suitable for use as an interchangeable film magazine of the types heretofore proposed for sound-and-picture-on-film reproducing systems.

It is an object of the invention therefore, to provide a new and improved sound-and-picture-on-film reproducing system including a readily engageable and disengageable film magazine which is simple and inexpensive in construction.

It is another object of the invention to provide a new and improved sound-and-picture-on-film reproducing system including a readily engageable and disengageable film magazine which is free from one or more of the usual limitations of prior art devices of this type including a precision finish, ruggedness, rigidity, and a high degree of dimensional stability.

It is a further object of the invention to provide a new and improved sound-and-picture-on-film reproducing system including a readily engageable and disengageable interchangeable film magazine which includes only passive film-engaging and film-positioning devices and channels.

In accordance with the invention, there is provided a sound-and-picture-on-film reproducing system comprising a basic film-transport and film-transducer apparatus including a sound-scanning device, a film gate, and all active film-advancing and film-positioning devices, and a film magazine readily engageable and disengageable with the basic apparatus and including means for supplying and taking up film, the film magazine including nonpositioning, nondriving, passive, film-guiding rolls and channels. The system also comprises means retractable from the path of the film magazine during insertion in the basic apparatus and movable to position the film and to register the same with the sound-scanning device and to engage the film with the film-advancing device after insertion of the film magazine. By the term "positioning," as used herein and in the appended claims, is meant the precise location of the film with respect to the film-transducing and film-advancing devices of the apparatus. By the term "nonpositioning," as used herein and in the appended claims, is meant that the location of these devices may include some latitude of relative movement to permit precise positioning by other instrumentalities. By the term "passive" device or element, as used herein and in the appended claims, is meant a device or element which does not, by itself or in cooperation with a device or element of the basic apparatus, position the film with respect to the film transducers or advance the film through the apparatus.

For a better understanding of the present invention, together with other and further objects thereof, reference is had to the following description, taken in connection with the accompanying drawings, while its scope will be pointed out in the appended claims.

Referring now to the drawings:

FIG. 2a is a fragmentary plan view of an alternate mechanism for feeding the film back to the reel; while

Figure 2A:
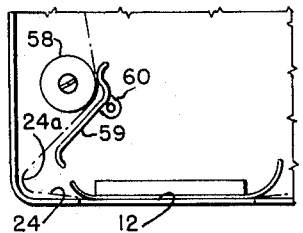
Figure 1:
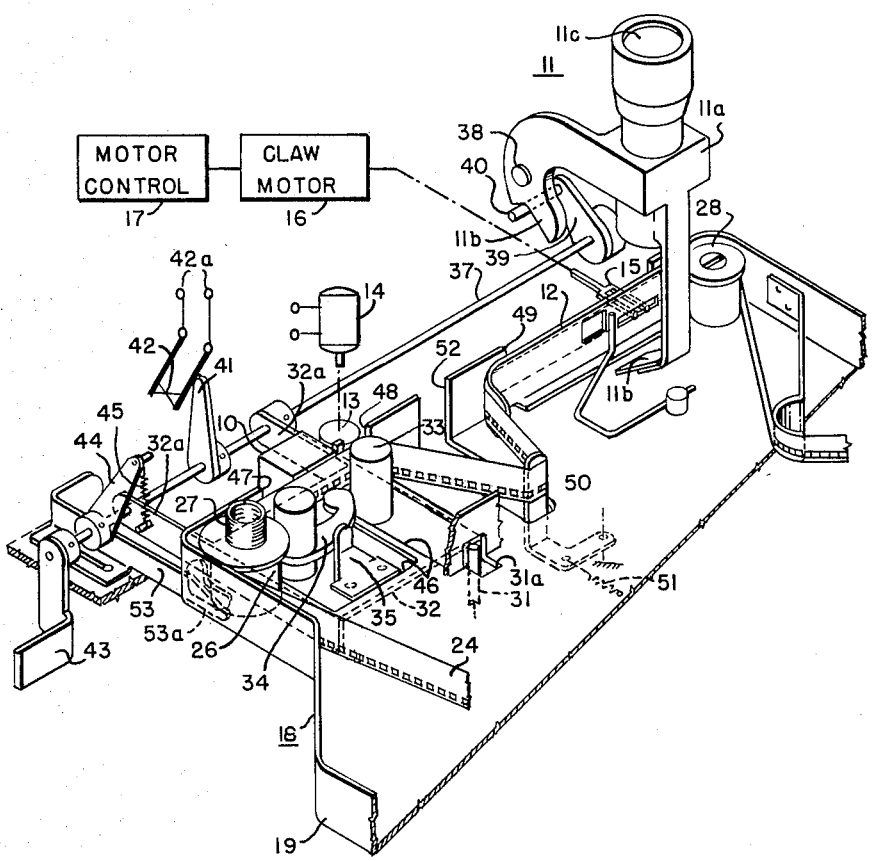
FIG. 1 is a perspective view, partly schematic, of a complete sound-and-picture-on-film reproducing system including a fragmentary view of a disengageable film magazine embodying certain features of the invention.

Referring now specifically to the drawings, a sound-and-picture-on-film reproducing system embodying the invention comprises a basic film-transport and film-transducer apparatus including a sound scanning head 10 which may be of conventional construction, an optical projection system 11, and a continuous-motion film-advancing mechanism, such as a capstan 13 and a driving motor 14, these latter two elements also being of conventional construction. The optical projection system 11 includes a frame 11a having a mirror 11b supported on a depending bracket and adapted to receive the transmitted image projected through the film from a light source (not shown) and reflect it upward through a lens system 11c to a suitable viewing screen, not shown. The basic film-transport apparatus also includes means for intermittently advancing the film across film gate 12 disposed in the film magazine described hereinafter. This means may be in the form of a claw 15, a claw motor 16, and a motor control 17, all of which may be conventional elements. Alternatively, the motor control unit 17 may be of the type described and claimed in applicant's prior application, Serial No. 249,092, filed January 2, 1963.

The sound-and-picture-on-film reproducing system of the invention also includes a film magazine 18 readily engageable and disengageable with the basic apparatus and including a housing or casing 19 which may be of molded thermoplastic resin and provided with a detachable cover 20 of similar material. The magazine 18 includes means for supplying and taking up film and, as illustrated, this means comprises a single spool or reel 21 having a central hub 22 journalled on a stud 23 secured in the base of the housing 19. The reel 21 is designed to receive a film 24 in the form of an endless belt wound on the hub 22 which, in operation, is fed from the central hub 22 over a guide arm 25 through the film-guiding elements in the casing, to be described later, and is rewound on the outer periphery of the film stock on the hub 22. It will be understood that this method of film feed and takeup, which is conventional, is shown by way of example and that other film feed and takeup apparatus well known in art may be substituted therefor.

The film magazine of the invention includes only non-positioning, passive film-guiding rolls and channels. Specifically, the magazine 18 includes a film guide roll 26 pivotally mounted substantially one forward corner of the housing 19 and adjustable transversely to the plane of the housing 19 but biased by a spring 27 engaging the cover 20 into engagement with the base of the housing 19. The magazine 18 further includes a fixed roller 28 rotatably mounted in the opposite forward corner of the housing 19.

The film magazine of the invention further comprises a latch mechanism for restraining the supply and takeup means, specifically the spool 21. To this end, the periphery of the spool 21 has a series of notches 21a, 21a while a latch element 29, pivotally mounted from the base of the housing 19, is biased by a spring 30 into engagement with the notches 21a, 21a so that normally the reel 21 is restrained from rotational movement when the magazine 18 is disengaged from the reproducing apparatus. The latch 29 has an extending arm 29a adapted to be engaged by a member or push rod 31 extending from the reproducing apparatus frame and extending through an opening 31a in the housing 19 to release the latch 29 upon insertion of the magazine 18 into the reproducing apparatus. As shown, the film guide 25 is a rounded and polished extension of the latch 29.

The sound-and-picture-on-film reproducing system further comprises means retractable from the path of the film magazine 18 during insertion and withdrawal of the magazine in the reproducing apparatus and movable to position the film and to register the same with respect to the sound pickup head 10 and the optical projection system 11 and to engage the film with the film-advancing devices after insertion of the magazine in the apparatus. This retractable means comprises a sub-frame 32 on which is disposed a rotatably mounted pinch roll 33, a pivotally mounted pressure arm 34 biased by a spring 35 to engage the edge of a film 24 carrying the sound track and press it against the sound pickup head 10. The sub-frame 32 has a pair of integrally extending arms 32a, 32a pivotally mounted on a shaft 37 pivotally supported in the frame of the reproducer apparatus. Similarly, the optical projection system 11 may be pivotally mounted on a stud 38 secured to the frame of the apparatus and is adapted to be retracted from the path of movement of the film magazine 18 by an arm 39 also secured to shaft 37 and having a pin 40 engaging an arm 11b of the optical projection system 11. Disposed on the shaft 37 is a second arm 41 cooperating with a switch 42 having terminals 42a for inclusion in the electrical circuits of the apparatus (not shown) to make certain that they are deenergized whenever a film magazine 18 is not inserted in the reproducing apparatus. Further secured to the shaft 37 is a manually operable lever 43 for moving the sub-frame 32 and the optical projection system 11 into operating positions upon insertion of a film magazine 18 and retracting the same to permit withdrawal of the film magazine. Also secured to shaft 37 is an arm 44 provided with a biasing spring 45 to bias the sub-frame 32 for counterclockwise movement about the shaft 37 so as to press the pinch roll 33 against the capstan 13.

To permit the withdrawal of the retractable elements described and their repositioning to engage a film 24 with the reproducer apparatus, the base of the housing 19 is provided with a series of cutouts or openings 46 through which the elements mounted on the sub-frame 32 may be inserted and retracted. Similarly, the front wall of the housing 19 is provided with openings 47 and 48 to permit engagement of a film with the sound pickup head 10 and the driving capstan 13 and an opening 49 to permit the illumination of a film passing the film gate 12 and engagement of film-advancing claw 15 with the sprocket holes of a film. In addition, the cover 20 of the housing 19 is provided with an opening 49a for insertion and retraction of the optical projection system 11.

Preferably, the sound-and-picture-of-film reproducing system of the invention includes a loop forming and sensing device to accommodate the variations in the difference in the velocities of the film as it passes the continuously rotating capstan 13 and the intermittently advancing claw 15. To this end, there is pivotally attached to the frame of the basic apparatus an upstanding resilient arm 50 adapted to engage a film 24 as the magazine 18 is inserted in the reproducer apparatus and including a soft biasing spring 51 permitting the arm 50 to oscillate back and forth which, with its own resilience, absorbs the differences in the velocities of the film, as described. The magazine housing 19 is provided with a slot 52 to accommodate the upstanding arm 50 upon engagement of a magazine in the apparatus.

In order precisely to position the film 24 transversely of the magazine 18, there is provided a member or arm 53 extending from the frame of the reproducer apparatus and having a tapered end 53a extending through an opening 53b and engaging the edge of the film 24 which is biased against the arm 53 by spring 27 and guide roll 26, accurately to adjust the film 24 vertically upon insertion of the magazine in the reproducing apparatus.

Figure 2:
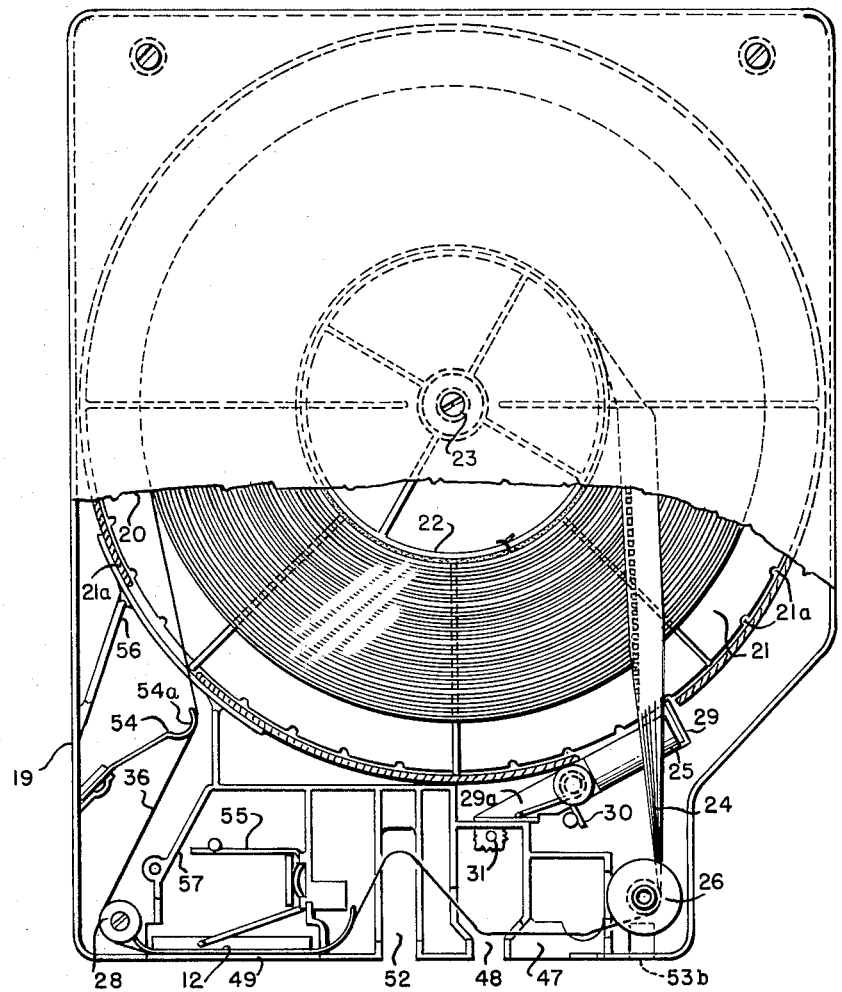
FIG. 2 is a plan view of the film magazine of FIG. 1 with a portion of the cover plate broken away.
Figure 3:
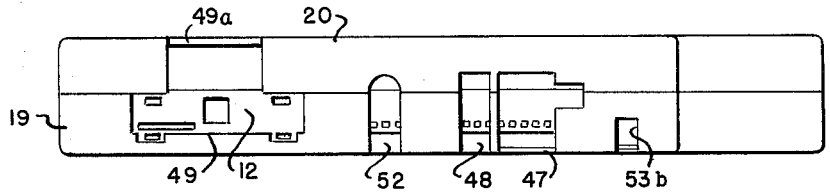
FIG. 3 is an end view of the film magazine of FIG. 2.

Referring specifically to FIG. 2 of the drawings, there is provided a member for accommodating the difference in absolute velocity of the film, as it leaves the film gate 12 and guide roll 28, and its velocity as it is taken up or rewound on the reel 21. This means may be simply in the form of a light spring arm 54 having a smooth arcuate end 54a engaging the film and tending to form a semi-loop. The film gate 12 is biased into engagement with the forward face of the housing 19 by a suitable U-shaped spring element 55. The housing 19 may be formed with a number of suitable stiffening ribs, conventional in molding practice, two of these ribs, 56 and 57, forming a channel closed by the cover 20 to aid in guiding the film for rewinding on the reel 21 and to avoid its possible entanglement in the film magazine. An alternate arrangement for feeding the film 24 back to the reel 21 is shown in the fragmentary view of FIG. 2a and comprises an idling brake roller 58 over which the film 24 passes engaged by a lightly biased spring arm 59 pivotally mounted at 60 and effective to form a compensating loop 24a.

It is believed the operation of the sound-and-picture-on-film reproducing system of the invention will be apparent from the foregoing description. In brief, before the insertion of a film magazine 18 in the film-reproducing apparatus, the lever 43 will be actuated to retract the sub-frame 32 and the devices mounted thereon in a clockwise direction out of the path of movement of the film magazine 18. Concurrently, the arm 41 will be moved clockwise to open the switch 42 and deenergize the electrical circuits of the apparatus. Also concurrently, the shaft 37 and arm 39 will actuate the optical projection system 11 counterclockwise about its pivot 38, also to withdraw it from the path of movement of the film magazine 18.

The film magazine 18 may then be readily inserted into the reproducing apparatus and latched in position by conventional latch mechanisms not shown. Upon engagement of the film magazine 18 in the reproducing apparatus, the lever 43 is actuated in a counterclockwise direction so that the elements on the sub-frame 32, specifically the pressure arm 34 and the pinch roll 33, move upwardly through the apertures 46 in the base of the housing 19 and engage the film 24 with the sound pickup head 10 and the capstan 13.

Simultaneously, as the film magazine 18 is moved into engagement, the arm 50 engages the film 24 to form the usual loop to account for differences in instantaneous velocities of the film at the capstan 13 and the film gate 12. Also concurrently, the optical projection system 11 is moved clockwise about its pivot 38 so that the arm carrying the mirror 11b moves downwardly through the aperture 49a in the cover 20. At the same time, the arm 41 closes the switch 42 so as to energize the electrical circuits of the apparatus under the control of any suitable manually operated push button or the like.

The reproducing system is now ready for operation and, upon the closing of electrical circuits to start the capstan motor 14 and the claw motor 16, the film 24 will be advanced through the reproducing apparatus in a conventional manner. It is to be noted that the film magazine 18 includes only passive, nonpositioning, nondriving elements and devices so that all of the film-positioning and film-advancing is effected by means of elements and devices supported on the main frame of the reproducing apparatus. With this arrangement, there are substantially no stresses on any part of the film magazine 18 so that it need not be of rugged and rigid construction and need not require unusual dimensional stability. With this arrangement a library of film magazines may be quickly and readily interchanged. Furthermore, the film magazine 18 may be of any desired size, it only being necessary that the forward part, shown of constricted width, be of appropriate dimension to fit into the reproducing apparatus.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A sound-and-picture-on-film reproducing system comprising:
    (a) a basic film-transport and film-transducer apparatus including a sound-scanning device, a film gate, and active film-advancing and film-positioning devices;
    (b) a film magazine readily engageable and disengageable with said apparatus and including means for supplying and taking up film;
    (c) said magazine including nonpositioning, nondriving, passive, film-guiding rolls and channels;
    (d) and means retractable from the path of said film magazine during insertion in said apparatus and movable to position said film and to register the same with said sound-scanning device and to engage said film with said film-advancing device after insertion of said film magazine.

2. A sound-and-picture-on-film reproducing system comprising:
    (a) a basic film-transport and film-transducer apparatus including a sound-scanning device, a film gate, and a continuous-motion film-advancing mechanism;
    (b) a film magazine readily engageable and disengageable with said apparatus and including a housing and means for supplying and taking up film;
    (c) said magazine including nonpositioning, nondriving, passive, film-guiding rolls and channels;
    (d) and means retractable from the path of said film magazine during insertion in said apparatus and movable to position said film and to register the same with said sound-scanning device and to engage said film with said film-advancing device after insertion of said film magazine,
    (e) said magazine housing including openings for receiving said retractable means during insertion in said apparatus.

3. A sound-and-picture-on-film reproducing system comprising:
    (a) a basic film-transport and film-transducer apparatus including a sound-scanning device, a film gate, a film-loop former, and a continuous-motion film-advancing mechanism;
    (b) a film magazine readily engageable and disengageable with said apparatus and including a housing and means for supplying and taking up film;
    (c) said magazine including nonpositioning, nondriving, passive, film-guiding rolls and channels;
    (d) and means retractable from the path of said film magazine during insertion in said apparatus and movable to position said film and to register the same with said sound-scanning device and to engage said film with said film-advancing device after insertion of said film magazine,
    (e) said magazine housing including openings for receiving said retractable means and said film-loop former during insertion in said apparatus.

4. A sound-and-picture-on-film reproducing system comprising:
    (a) a basic film-transport and film-transducer apparatus including a sound-scanning device, a film gate, and active film-advancing and film-positioning devices;
    (b) a film magazine readily engageable and disengageable with said apparatus and including means for supplying and taking up film;
    (c) said magazine including a transversely adjustable, passive, film-guiding roll;
    (d) means retractable from the path of said film magazine during insertion in said apparatus and movable to position said film and to register the same with said sound-scanning device and to engage said film with said film-advancing device after insertion of said film magazine;
    (e) and a member extending from said apparatus and engaging said guide roll to position the same upon insertion of said magazine.

5. A sound-and-picture-on-film reproducing system comprising:
    (a) a basic film-transport and film-transducer apparatus including a sound-scanning device, an optical projection system, a film gate, and active film-advancing and film-positioning devices;
    (b) a film magazine readily engageable and disengageable with said apparatus and including a housing and means for supplying and taking up film;
    (c) said magazine including nonpositioning, nondriving, passive, film-guiding rolls and channels;
    (d) and means retractable from the path of said film magazine during insertion in said apparatus and movable to position said film and to register the same with said sound-scanning device and said optical transducer and to engage said film with said film-advancing device after insertion of said film magazine,
    (e) said magazine housing including apertures for receiving said retractable means.

6. A sound-and-picture-on-film reproducing system comprising:
    (a) a basic film-transport and film-transducer apparatus including a sound-scanning device, a film gate, a film-loop former, and a continuous-motion film-advancing mechanism;
    (b) a film magazine readily engageable and disengageable with said apparatus and including a housing and means for supplying and taking up film;
    (c) said magazine including nonpositioning, nondriving, passive, film-guiding rolls and channels;
    (d) and means retractable from the path of said film magazine during insertion in said apparatus and movable to position said film and to register the same with said sound-scanning device and to engage said film with said film-advancing device after insertion of said film magazine,
(e) said magazine housing including separate apertures for individually receiving each of said retractable means during insertion in said apparatus.

7. A sound-and-picture-on-film reproducing system comprising:
(a) a basic film-transport and film-transducer apparatus including a sound-scanning device, a film gate, and active film-advancing and film-positioning devices;
(b) a film magazine readily engageable and disengageable with said apparatus and including means for supplying and taking up film and a latch mechanism for restraining said supply and takeup means;
(c) said magazine including nonpositioning, nondriving, passive, film-guiding rolls and channels;
(d) means retractable from the path of said film magazine during insertion in said apparatus and movable to position said film and to register the same with said sound-scanning device and to engage said film with said film-advancing device after insertion of said film magazine;
(e) and a member extending from said apparatus and engaging said latch mechanism to release the same upon insertion of said magazine in said apparatus.

8. A sound-and-picture-on-film reproducing apparatus comprising:
(a) a sound-scanning device;
(b) a film gate;
(c) a readily engageable and disengageable film magazine including means for supplying and taking up film;
(d) a constant-speed device disposed beyond the sound-scanning device in the direction of film motion for engaging the film and withdrawing it from said supply means;
(e) an intermittently operating mechanism for advancing the film past the film gate and for normally forming a slack loop between the gate and the sound-scanning device;
(f) a path for returning the film after passing the gate directly to said takeup means;
(g) and means retractable from the path of said film magazine during insertion in the apparatus and movable to engage the film with said sound-scanning device and said constant-speed device after insertion of said film magazine.

9. A sound-and-picture-on-film reproducing apparatus comprising:
(a) a sound-scanning device;
(b) a film gate;
(c) a readily engageable and disengageable film magazine including means for supplying and taking up film and having an opening in one wall thereof;
(d) a constant-speed device disposed beyond the sound-scanning device in the direction of film motion for engaging the film and withdrawing it from said supply means;
(e) an intermittently operating mechanism for advancing the film past the film gate and for normally forming a slack loop between the gate and the sound-scanning device;
(f) a path for returning the film after passing the gate directly to said takeup means;
(g) and a pivoted assembly retractable from the path of said film magazine during insertion in the apparatus and including a film guide and a pinch roll engaging said film with said sound-scanning device and said constant-speed device respectively upon pivotal movement of the assembly through said wall opening after insertion of said film magazine.

References Cited by the Examiner

UNITED STATES PATENTS

| | | | |
|---|---|---|---|
| 2,175,538 | 10/1939 | Morsbach et al. | 352—77 |
| 2,226,363 | 12/1940 | Williams | 352—72 |
| 3,126,163 | 3/1964 | Knox | 242—55.19 |
| 3,176,310 | 3/1965 | Finnerty | 352—72 X |

FOREIGN PATENTS

| | | |
|---|---|---|
| 1,306,575 | 9/1962 | France. |
| 924,195 | 4/1963 | Great Britain. |

NORTON ANSHER, *Primary Examiner.*

WILLIAM MISIEK, *Examiner.*